United States Patent [19]
Ainsworth

[11] Patent Number: 5,343,138
[45] Date of Patent: Aug. 30, 1994

[54] BATTERY DISCHARGING AND CHARGING

[75] Inventor: Steven Ainsworth, Boulder City, Nev.

[73] Assignee: Harvey W. O'Conor, Weston, Mass.

[21] Appl. No.: 779,400

[22] Filed: Oct. 18, 1991

Related U.S. Application Data

[63] Continuation-in-part of Ser. No. 573,623, Aug. 27, 1990, abandoned.

[51] Int. Cl.[5] .............................................. H02J 7/10
[52] U.S. Cl. ........................................ 320/14; 320/25; 340/636
[58] Field of Search .................. 320/2, 13, 14, 25, 26, 320/48; 340/636

[56] References Cited

U.S. PATENT DOCUMENTS

| | | | |
|---|---|---|---|
| 3,700,999 | 10/1972 | Gourse | 320/26 |
| 3,710,225 | 1/1973 | Herzig | 320/14 X |
| 4,081,743 | 3/1978 | Madden | 320/13 X |
| 4,698,579 | 10/1987 | Richter et al. | 320/14 |
| 4,742,289 | 5/1988 | Wahlström | 320/14 |
| 5,159,258 | 10/1992 | Kolvites et al. | 320/14 |

*Primary Examiner*—R. J. Hickey
*Attorney, Agent, or Firm*—Fish & Richardson

[57] ABSTRACT

A storage battery is first substantially fully discharged before it is charged. A load impedance is first connected across the battery to receive current from the battery and develop a signal representative of the state of charge of the battery. Sensing this signal provides an indication of when the battery becomes substantially fully discharged. The load impedance is then disconnected, and the battery then receives charging current. A full-wave rectifier couples the battery to an LED that may be coupled to the battery to provide the indication of when the battery becomes substantially fully discharged. This indication may be used to operate relays to disconnect the load impedance from across the battery and charge the battery.

9 Claims, 3 Drawing Sheets

BATTERY DISCHARGER/CHARGER

BATTERY DISCHARGER/CHARGER

AINSWORTH CHARGER/DISCHARGER

SIMPLE DISCHARGER

BATTERY DISCHARGING AND CHARGING

This application is a continuation-in-part of application Ser. No. 07/573,623 filed Aug. 27, 1990, now abandoned entitled BATTERY DISCHARGING.

The invention generally pertains to the field of battery dischargers and more specifically to an improved battery discharger for quickly discharging small-capacity rechargeable batteries, and providing a visual means of determining when the discharge is substantially complete. A feature of the invention resides in immediately recharging the battery immediately after discharge is substantially complete.

Nickel-cadmium batteries are finding increasing use because of their compactness and rechargeable characteristics. One drawback, however, is that they have a "memory." If you repeatedly partially discharge them and then recharge them, they "remember" the discharge level and will not produce the required current below that previous partially discharged level. If, however, the batteries are occasionally nearly completely discharged, the performance will return, providing a longer function life. Since the voltage and current of the battery drops below a useable level prior to complete discharge, most devices do not provide a means to completely discharge the battery without making the device unusable for an extended period during the discharge.

Also, it has been found that following storage, nickel-cadmium batteries should first be discharged to remove any oxide which may have formed on the cadmium electrode, thereby allowing proper charging and operation of the battery.

It is an important object of this invention to provide improved charge-discharge cycle life by providing an economical, simple and effective method of discharging a battery.

Another object of the present invention is to provide a visual method of monitoring when the discharge process is substantially complete.

According to the invention, a load impedance, such as a resistor, is placed across the battery to draw current from the battery through the load impedance and develop a signal, such as a voltage, representative of the charge state of the battery that drops to a predetermined threshold level when the battery is substantially fully discharged. Sensing the occurrence of this threshold level, such as with an LED through a full-wave rectifier, provides an indication that the battery is substantially fully discharged. Charging current is then preferably promptly delivered to the substantially fully discharged battery until the battery is fully charged.

Circuitry according to the invention may include first and second input terminals for connection to respective battery terminals, a load impedance, such as a resistor, connected between the first and second input terminals, and an indicator coupled to the load impedance for providing an indication of when a battery connected between the first and second input terminals is substantially fully discharged. The indicator is preferably an LED coupled to the load impedance by a full-wave rectifier and series resistance so that the threshold voltage of the LED corresponds to the battery reaching substantially complete discharge. Upon reaching this threshold level a switch may be manually or automatically actuated to disconnect the load impedance from the battery and connect a charging source until the battery is fully charged.

A feature of the invention resides in promptly recharging the battery immediately after sensing substantially complete discharge.

Other features and advantages of the invention will become apparent from the following detailed description when read with the accompanying drawing, in which.

Figure 1:
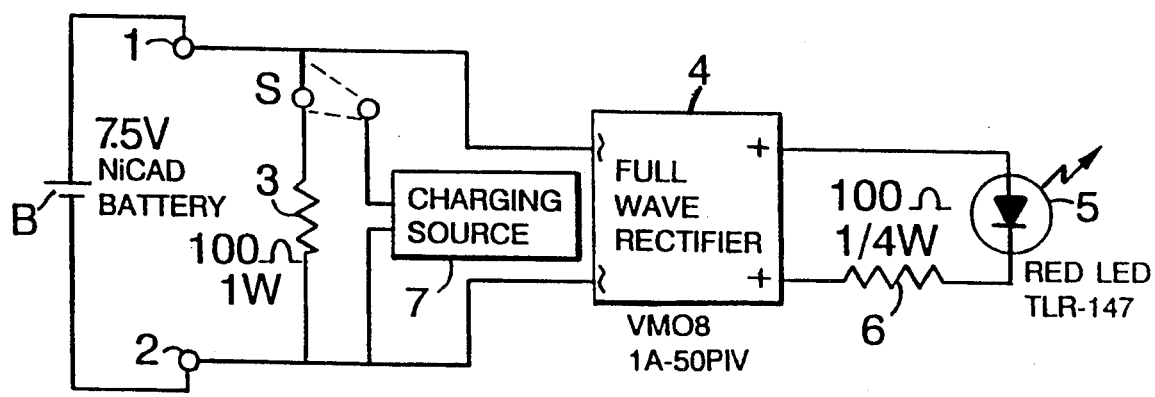
FIG. 1 is a schematic diagram of an embodiment of the invention.

Referring now to the drawing, and more particularly FIG. 1 thereof, input terminals 1 and 2 are adapted to allow interface between the discharger and the battery to be discharged. Resistor 3 is thereby placed across the terminals of battery B to be discharged through switch S, providing current limiting during discharge.

The visual monitor comprises a full-wave bridge rectifier 4, connected in parallel with resistor 3, and LED 5 in series with resistor 6, both connected in parallel with resistor 3 through full-wave bridge rectifier 4.

Bridge rectifier 4 provides the proper polarity to activate the visual monitor, regardless of the polarity of the battery connection. Resistor 6 allows LED 5 to turn off at a predetermined voltage level of the battery, indicating nearly complete discharge.

A nearly complete discharge state occurs when the battery voltage level drops below the illuminating threshold level of LED 5 to extinguish LED 5, indicating that battery B is substantially fully discharged. Switch S may then be manually or automatically actuated to disconnect resistor 3 from battery B and connect charging source 7 to battery B until battery B is fully charged.

Although this invention has been specifically described in connection with nickel-cadmium batteries, it can be applied to other batteries such as silver-cadmium and leadacid types, such as those associated with, but not limited to, motor vehicles, marine craft, aircraft, mobile telephones, electronic equipment, telecommunication equipment, toys and small appliances.

The process according to the invention includes placing a load impedance, such as resistor 3, across the battery to draw current from the battery through the load impedance and develop a voltage across the load impedance that drops to a predetermined threshold level when the battery is substantially fully discharged, and detecting this predetermined threshold level, such as with LED 5 through full-wave rectifier 4, to provide an indication that the battery is substantially fully discharged. The battery then preferably promptly receives charging current until it is fully charged.

Figure 2:
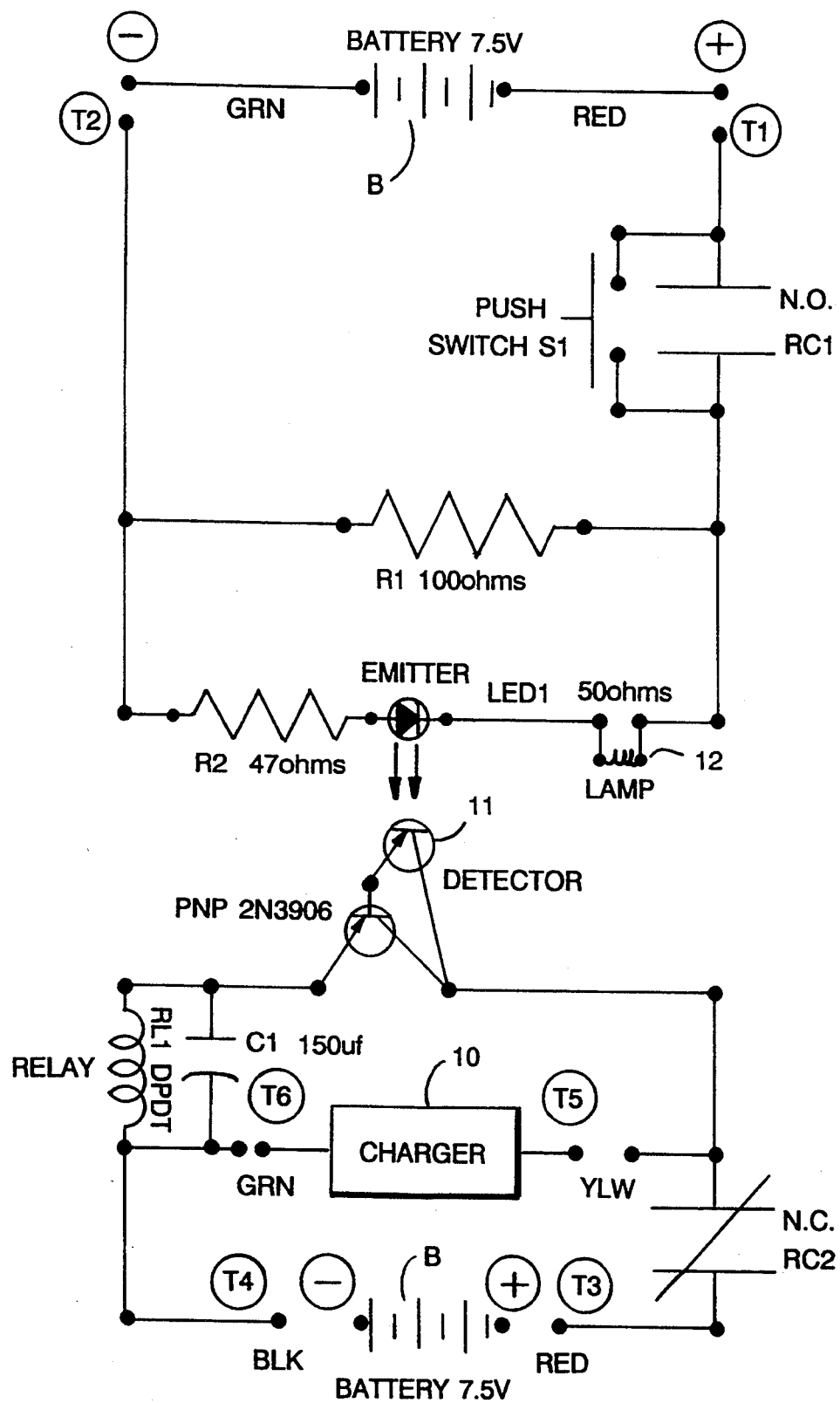
FIG. 2 is a schematic circuit diagram of an embodiment of the invention for automatically recharging.

Referring to FIG. 2, there is shown another embodiment of the invention for charge and discharge. Input terminals T1 and T2 are adapted to allow interface between the discharger and the terminals of the battery B to be discharged. With the battery B connected across terminals T1 and T2, depressing switch S1 begins discharge through LED1 emitter which activates LED1 detector 11 to energize the relay coil of relay RL1 to open normally closed relay contacts RC2 and close normally open relay contacts RC1 to latch the relay and place resistor R1, which provides current limiting during discharge, across the terminals of battery B to be discharged. Opening relay contacts RC2 with relay coil RL1 energized disconnects the charge terminals of battery B from the charging source during the discharge cycle.

The circuit may include an indicator light 12 connected in series with LED1 and resistor R2, both connected in parallel with resistor R1 to the battery B through closed relay contacts RC1.

Resistor R2 allows LED1 to extinguish at a predetermined voltage level of the battery corresponding to substantially complete discharge, switching off both the indicator lamp 12 and LED1 emitter, to indicate nearly complete discharge.

A nearly complete discharge state occurs when the battery voltage level drops below the illuminating threshold voltage level of LED1 to extinguish LED1, thereby indicating that battery B is substantially fully discharged. Relay coil RL1 is then de-energized to open relay contacts RC1 and disconnect resistor R1 from battery B while closing relay contacts RC2, thus reconnecting charging source 10 to battery B until the battery is fully charged. Battery B may then be removed from terminals T1 and T2 for use. Alternatively, known techniques may be used for reducing the charging current from charger 10 when battery B is fully charged. For illustration purposes it is convenient to show separate terminals T3 and T4 adapted for connection to battery B for charging; however, terminals T3 and T4 may coincide with terminals T1 and T2.

Figure 3:
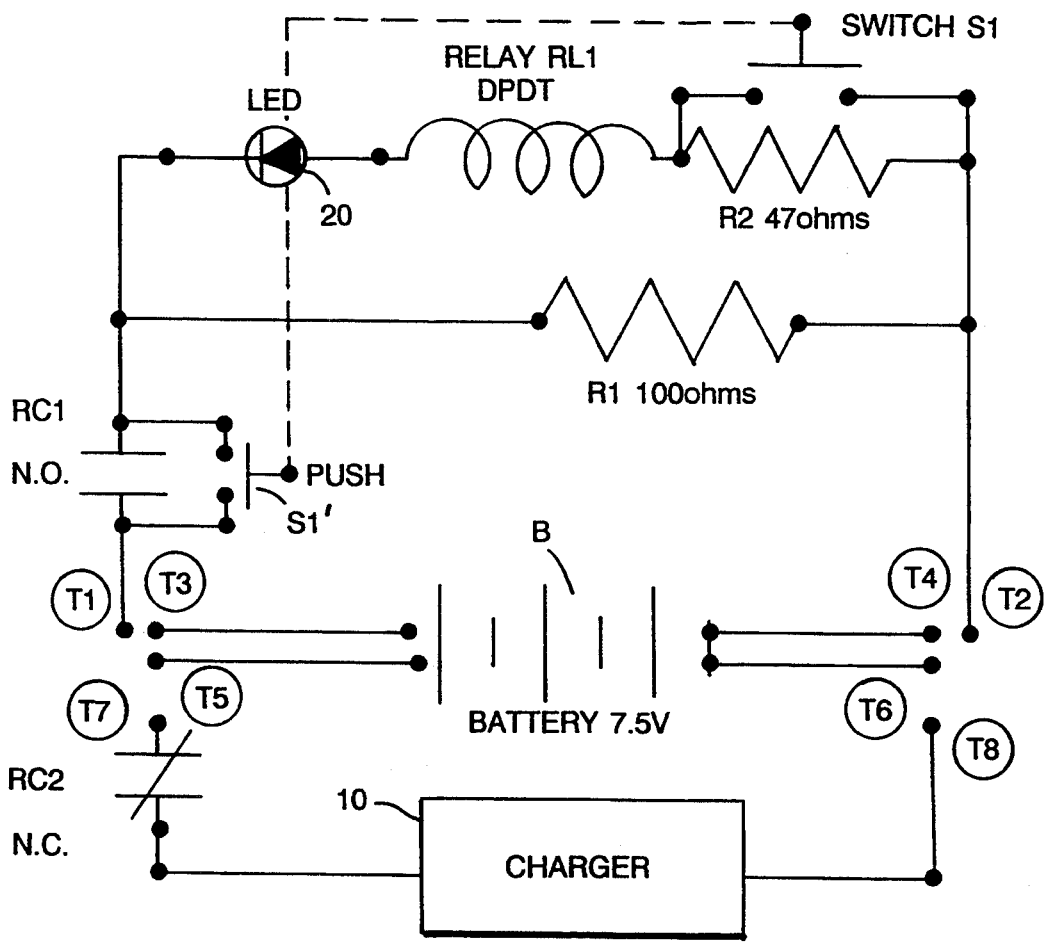
FIG. 3 is another embodiment of the invention using the threshold cutoff of the LED.

Referring to FIG. 3, there is shown another embodiment of the invention including a latching circuit in which pressing switch S1' energizes the coil of relay RL1 through LED 20 and latches the relay by closing normally open contacts RC1 while battery B discharges through resistor R1 while opening normally closed relay contacts RC2 to disconnect charger 10 from battery 1B. When discharge is substantially complete, LED 20 extinguishes, the relay coil of relay RL1 is de-energized, opening contacts RC1 and closing contacts RC2 so that charger 10 immediately begins recharging battery B.

Figure 4:
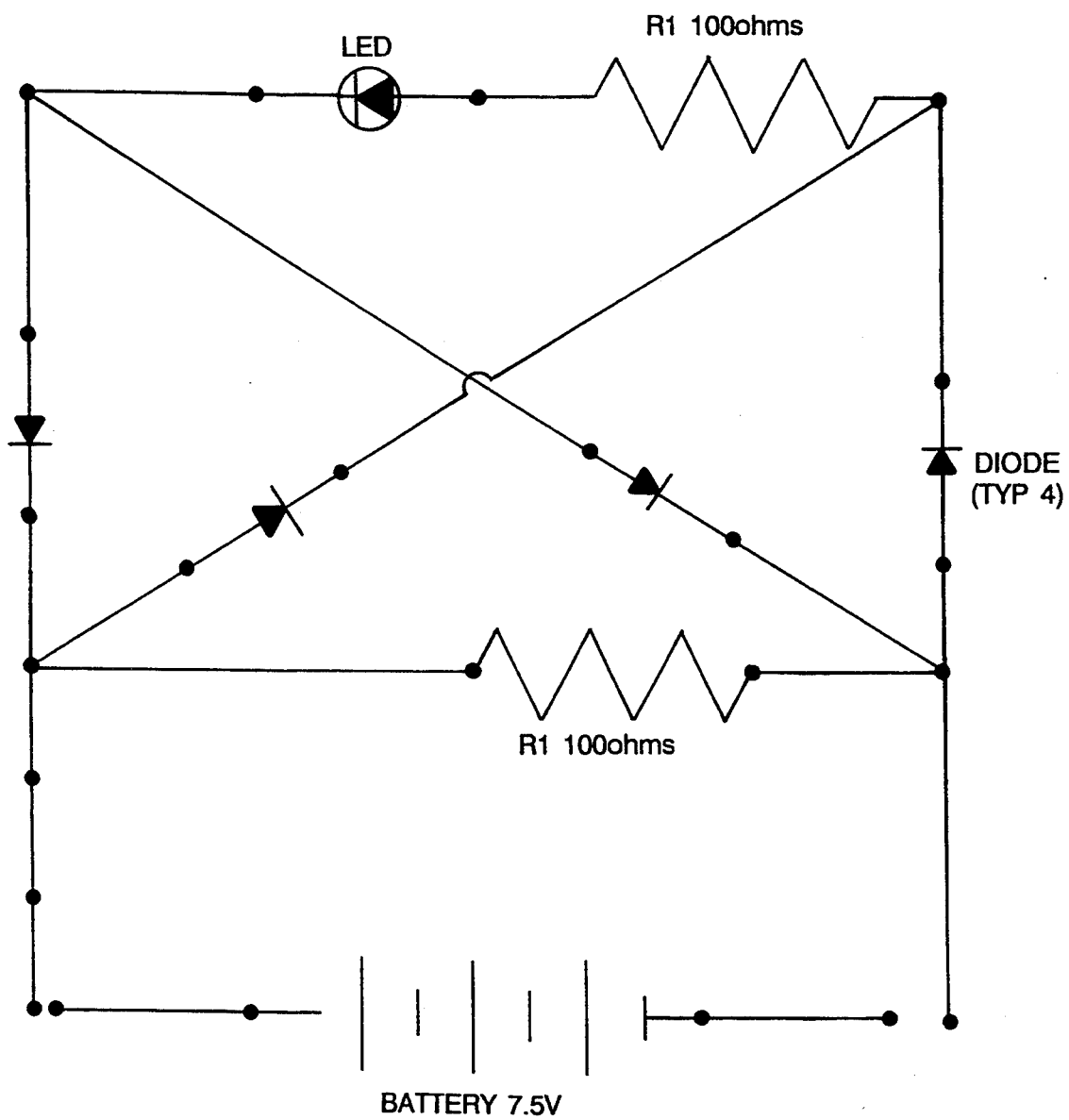
FIG. 4 is a simple discharge only circuit with an LED visual indicator.

Referring to FIG. 4, there is shown a circuit that only discharges the battery and is arranged so that when the battery is substantially fully discharged, the LED is extinguished, thereby indicating substantially complete discharge, whereby the battery may then be connected to a charging circuit.

Other embodiments are within the claims.

What is claimed is:

1. A discharge and charge circuit for a storage battery with a detector for fully discharging and then fully charging the storage battery to prolong the storage battery life comprising,
    a detector for providing an indication of when the storage battery is substantially fully discharged,
    first and second input terminals connected to the detector and for connection to the storage battery for delivering energy from the storage battery to the detector to produce the indication when the storage battery is substantially fully discharged,
    a load impedance,
    a charging source,
    and a switch for first connecting said load impedance between said first and second input terminals for discharging the storage battery and developing a signal representative of the state of charge of the storage battery and then connecting said charging source between said first and second input terminals for fully charging the storage battery immediately after the storage battery is fully discharged,
    wherein said detector comprises an LED and further comprising,
    a full-wave rectifier circuit coupling said first and second input terminals to said LED.

2. A discharge circuit in accordance with claim 1 and further comprising a resistor coupling said full-wave rectifier to said LED so that the voltage threshold level when said LED shifts from the illuminated state to the extinguished state occurs when said storage battery just becomes substantially fully discharged.

3. A discharge circuit for a storage battery comprising,
    first and second input terminals for connection to a storage battery,
    a load impedance connected between said first and second input terminals for discharging said battery,
    an LED for providing an indication of when said storage battery is substantially fully discharged,
    and circuitry coupling said first and second input terminals to said LED selected so that said LED is normally illuminated while said storage battery discharges through said load impedance and becomes extinguished when said storage battery just becomes substantially fully discharged,
    wherein said circuitry comprises a full-wave rectifier circuit.

4. A discharge circuit in accordance with claim 3 wherein said circuitry comprises a resistor so that the voltage threshold level when said LED shifts from the illuminated state to the extinguished state occurs when said storage battery just becomes substantially fully discharged.

5. A discharge circuit in accordance with claim 4 wherein said full-wave rectifier circuit couples said first and second input terminals to said LED.

6. A discharge and charge circuit for a storage battery for fully discharging and then fully charging the storage battery to prolong the storage battery life comprising,
    a detector for providing an indication of when the storage battery is substantially fully discharged,
    first and second input terminals connected to the detector and for connection to the storage battery to the detector to produce the indication when the storage battery is substantially fully discharged,
    a load impedance,
    a charging source,
    a latching circuit including said detector for selectively connecting said load impedance between said first and second input terminals for discharging the storage battery and developing a signal representative of the state of charge and connecting said charging source between said first and second input terminals for fully charging the storage battery immediately after the storage battery is fully discharged,
    and a switch for causing said latching circuit to disconnect said charging source from the battery and connect the load impedance across the battery,
    the latching circuit constructed and arranged to cause the latching circuit to disconnect the load impedance from across the battery terminals and connect the charging source to the battery terminals immediately upon the detector sensing substantially full discharge of the battery to immediately thereafter cause charging to the battery by said charging source, wherein said latching circuit is connected to said first and second input terminals so that said latching circuit receives operating power only from said battery.

7. A discharge and charge circuit for a storage battery for fully discharging and then fully charging the storage battery to prolong the storage battery life comprising, a detector for providing an indication of when the storage battery is substantially fully discharged, first and second input terminals connected to the detector and for connection to the storage battery to the detector to produce the indication when the storage battery is substantially fully discharged, a load impedance, a charging source, a latching circuit including said detector for selectively connecting said load impedance between said first and second input terminals for discharging the storage battery and developing a signal representative of the state of charge and connecting said charging source between said first and second input terminals for fully charging the storage battery immediately after the storage battery is fully discharged, and a switch for causing said latching circuit to disconnect said charging source from the battery and connect the load impedance across the battery, wherein said latching circuit comprises a relay having normally open contacts connected between the battery comprises a relay having normally open contacts connected between the battery and load impedance and normally closed contacts connected between the charging source and battery, said relay having a relay coil normally energized when the battery is being discharged, said switch connected across said normally open contacts to allow current to flow through said load impedance causing said relay to be energized and open said normally closed contacts while maintaining closed said normally open contacts until said battery is substantially fully discharged to de-energize said relay coil and close said normally closed contacts and open said normally open contacts to immediately begin recharging said battery.

8. A discharge and charge circuit for a storage battery in accordance with claim 7 wherein the detector comprises a LED coupled to the battery and arranged to extinguish when said battery is substantially fully discharged and a photoelectric detector photoelectrically coupled to said LED coupled to said relay coil causing current to flow through said relay coil when said LED is illuminated and stop flowing when said LED is extinguished.

9. A discharge and charge circuit for a storage battery in accordance with claim 7 wherein said latching circuit is connected to said first and second input terminals so that said latching circuit receives operating power only from said battery.

* * * * *